(12) United States Patent
Cao

(10) Patent No.: US 6,370,296 B1
(45) Date of Patent: *Apr. 9, 2002

(54) DENSE WAVELENGTH DIVISION MULTIPLEXER/DEMULTIPLEXER WITH PARALLEL SEPARATION OF WAVELENGTHS UTILIZING GLASS BLOCK INTERRUPTION OF THE OPTIC SIGNAL

(75) Inventor: Simon X. F. Cao, San Mateo, CA (US)

(73) Assignee: Avanex Corporation, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/247,611

(22) Filed: Feb. 10, 1999

(51) Int. Cl.$^7$ ............................................... G02B 6/293
(52) U.S. Cl. ........................... 385/24; 359/127; 385/15
(58) Field of Search ............................. 385/12, 15, 24, 385/31, 33, 37; 359/124, 127–131

(56) References Cited

U.S. PATENT DOCUMENTS

| | | | | |
|---|---|---|---|---|
| 5,005,935 A | * | 4/1991 | Kunikane et al. | 359/129 |
| 5,930,441 A | | 7/1999 | Betts et al. | 385/140 |
| 5,940,555 A | * | 8/1999 | Inaba et al. | 385/24 |
| 6,025,943 A | * | 2/2000 | Meekers et al. | 359/128 |
| 6,130,971 A | * | 10/2000 | Cao | 385/31 |
| 6,169,828 B1 | * | 1/2001 | Cao | 385/31 |

* cited by examiner

Primary Examiner—John D. Lee
(74) Attorney, Agent, or Firm—Sawyer Law Group LLP

(57) ABSTRACT

The present invention provides a dense wavelength division multiplexer for separating an optical signal into optical channels. This dense wavelength division multiplexer provides: a mechanism for inputting an optical signal, the optical signal having a plurality of optical channels; a mechanism for separating one or more of the plurality of optical channels by introducing a phase difference between at least two of the plurality of optical channels, wherein the mechanism includes an interruption of the optical signal by at least one glass block; and a mechanism for outputting the separated plurality of optical channels along a plurality of optical paths. The dense wavelength division multiplexer of the present invention provides an ease in alignment and a higher tolerance to drifts due to the increase in the width of the pass band. Its separators may also be placed in a multi-stage parallel cascade configuration to provide for a lower insertion loss by requiring an optical signal to travel through fewer optical components. The present invention may also be easily modified to perform the add/drop function as it separates channels. The materials required to manufacture and implement the dense wavelength division multiplexer in accordance with the present invention are readily available and do not require special or expensive materials or processes. It is thus cost effective.

15 Claims, 15 Drawing Sheets

DENSE WAVELENGTH DIVISION MULTIPLEXER/DEMULTIPLEXER WITH PARALLEL SEPARATION OF WAVELENGTHS UTILIZING GLASS BLOCK INTERRUPTION OF THE OPTIC SIGNAL

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple wavelengths may be transmitted along the same optical fiber. This totality of multiple combined wavelengths comprises a single transmitted signal. A crucial feature of a fiber optic network is the separation of the optical signal into its component wavelengths, or "channels", typically by a dense wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, wavelengths at San Francisco are multiplexed into an optical signal which will travel from San Francisco, add and drop channels with Sacramento's signal at connector point 140, and the new signal will travel forward to New York where it is demultiplexed into individual wavelengths. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal into its component channels is typically performed by a dense wavelength division multiplexer. Strictly speaking, a "multiplexer" is an apparatus that combines separate channels on separate paths into a single wavelength division multiplexed optical signal on a signal path. Further, strictly speaking, a "de-multiplexer" is an apparatus that separates a wavelength division multiplexed optical signal carried along a single path into component channels which propagate along separate paths. It is well known in the art, however, that a particular multiplexer or de-multiplexer apparatus can operate in either sense (i.e., as a multiplexer or as a de-multiplexer) by simple reversal of the light paths therethrough. Because of this, the single term "multiplexer" is conventionally utilized to described such an apparatus. Thus, in this specification, the term "multiplexer" is used in describing an apparatus which can perform both the multiplexing or the de-multiplexing function. The particular function of the apparatus should be clear from the context of the respective description. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the wavelength division multiplexer 230. The new signal is then returned to Loop 150 via node D (290). At the same time, $\lambda_1'$ is transferred from path 280-1 to path 250-1. It is combined with the others of Loop 110's channels into a single optical signal by the wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by dense wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is the precision required of a device for transmitting a signal into an optic fiber. A signal entering a dense wavelength division multiplexer must conform to a set of very narrow pass bands. FIG. 3 shows a sample spectrum curve 310 comprised of numerous channels as it enters a dense wavelength division multiplexer. The pass bands 320 of the channels are very narrow. Ideally, the curve would be a square wave. A narrow pass band is problematic because due to the physical limitations and temperature sensitivity of signal source laser devices ("transmitters"), they never emit light exactly at the center wavelengths of the pass bands of an optic filter. The difference between the actual wavelength and the wavelength at the center of the pass band is called the "offset." The amount of offset or change in offset ("drift") ideally should not be larger than the widths of the pass bands. Otherwise, crosstalk between channels will be too large. Crosstalk occurs when one channel or part of a channel appears as noise on another channel adjacent to it. Since the signals resulting from the conventional wavelength division multiplexer configurations have narrow pass bands, the signal source devices ("transmitters"), such as lasers or the like, must be of a high precision so that offset is limited to the width of the pass bands. This high precision is difficult to accomplish. Signal source devices of high precision are available but are very expensive. Also, the signal source devices must be aligned individually for each separator, which is time intensive.

Therefore, there exists a need for a dense wavelength division multiplexer with a method of separation which has a greater tolerance for wavelength offset and is easier to align. This method should also be cost effective to implement. The present invention addresses such a need.

SUMMARY OF THE INVENTION

The present invention provides a dense wavelength division multiplexer for separating an optical signal into optical channels. This dense wavelength division multiplexer provides: a mechanism for inputting an optical signal, the optical signal having a plurality of optical channels; a mechanism for separating one or more of the plurality of optical channels by introducing a phase difference between at least two of the plurality of optical channels, wherein the mechanism includes an interruption of the optical signal by at least one glass block; and a mechanism for outputting the separated plurality of optical channels along a plurality of optical paths. The dense wavelength division multiplexer of the present invention provides an ease in alignment and a higher tolerance to drifts due to the increase in the width of the pass bands. Its separators may also be placed in a multi-stage parallel cascade configuration to provide for a lower insertion loss by requiring an optical signal to travel through fewer optical components. The present invention may also be easily modified to perform the add/drop function as it separates channels. The materials required to manufacture and implement the dense wavelength division multiplexer in accordance with the present invention are readily available and do not require special or expensive materials or processes. It is thus cost effective.

DETAILED DESCRIPTION

The present invention relates to an improvement in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A dense wavelength division multiplexer (DWDM) in accordance with the present invention provides a phase differential method of wavelength separation utilizing glass block interruption of the optic signal. It provides for a higher tolerance to drifts and ease of alignment. Its separators may be placed in a multi-stage parallel cascade configuration to reduce insertion loss. The present invention may also be easily modified to perform the add/drop function as it separates channels. The method does not require special or expensive materials or processes, and thus is cost effective to implement.

To more particularly describe the features of the present invention, please refer to FIGS. 4 through 17 in conjunction with the discussion below.

Figure 4:
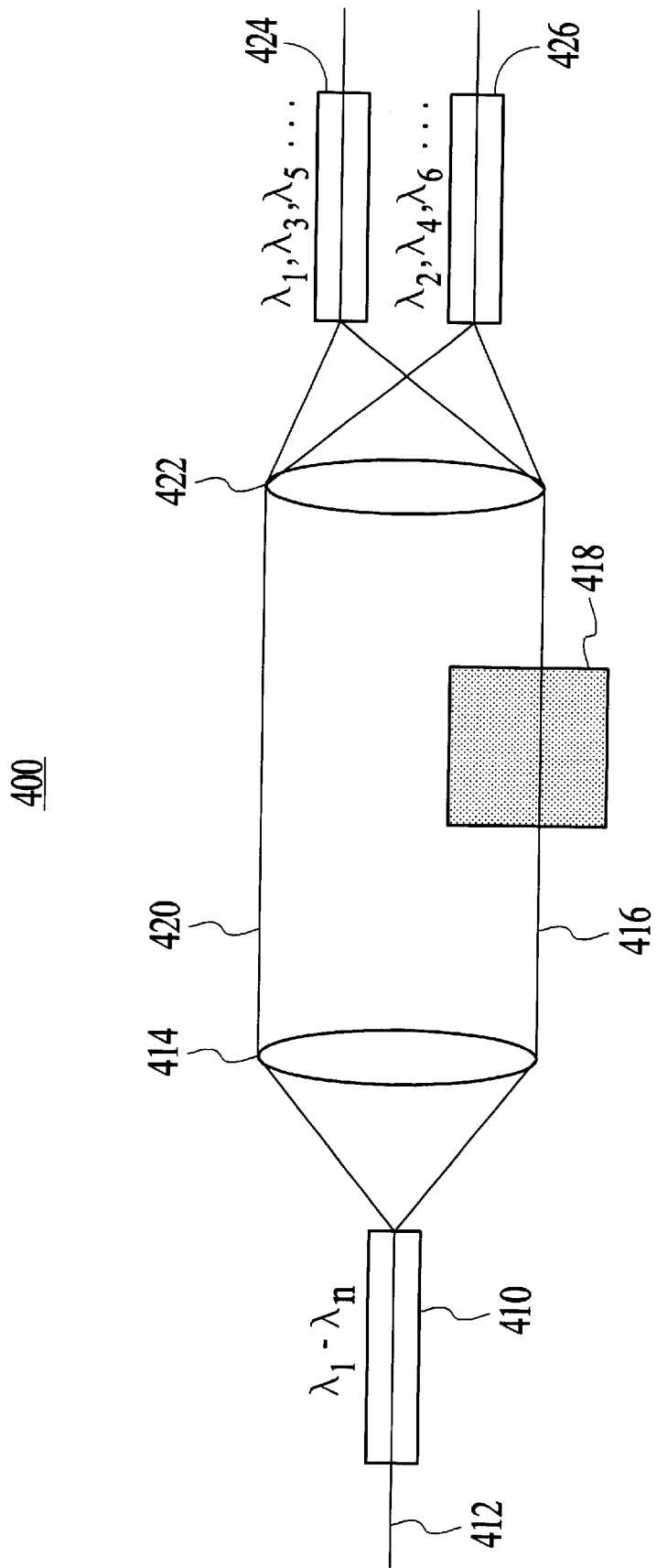
FIG. 4 is an illustration of a side view of a first preferred embodiment of a separator in accordance with the present invention.

An important feature of the DWDM of the present invention is the structure of its separators. FIG. 4 illustrates a first preferred embodiment of a separator in accordance with the present invention. The separator 400 comprises an input fiber 410 for carrying in an optical signal 412 containing channels $\lambda_1$–$\lambda_n$. The signal 412 begins to diffuse as it leaves the fiber 410, but a lens 414 collimates the signal 412. A portion 416 of the signal, preferably 50%, is then interrupted and forced to pass through a glass block 418 while the remaining portion 420 of the signal passes through air. In this specification, these portions 416 and 420 of the signal 412 will be referred to as "subsignals". The subsignals 416 and 420 are then converged by another lens 422 to output fibers 424 and 426. The output fibers 424 and 426 are aligned such that the odd channels ($\lambda_1$, $\lambda_3$, $\lambda_5$, . . . ) of the signal 412 are output to one fiber while the even channels ($\lambda_2$, $\lambda_4$, $\lambda_6$, . . . ) are output to the other. In this manner, the channels in the signal 412 are separated.

The separation of the odd and even channels are accomplished through the use of the glass block 418. An optical signal travels at a different speed through a glass block than through air. By passing the subsignals through materials with different refractive indexes, a phase difference is introduced between the subsignals.

Figure 5:
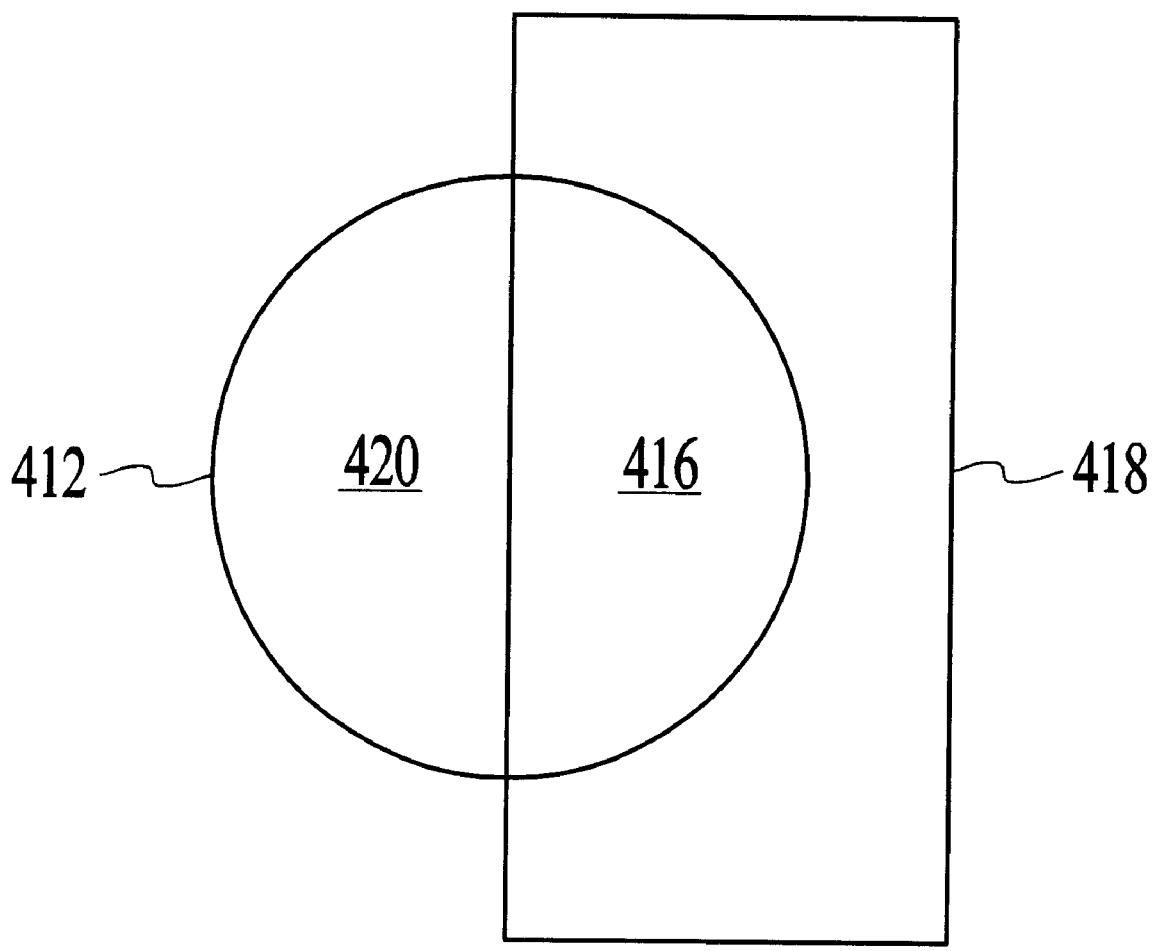
FIG. 5 is an illustration of a cross-section view of the first preferred embodiment of a separator in accordance with the present invention.

FIG. 5 illustrates a cross-sectional view of the signal 412 as subsignal 420 passes through the air while subsignal 416 passes through the glass block 418. The glass block 418 has a refractive index n. The first preferred embodiment uses a certain thickness L for the glass block 418 so that the phase difference between the subsignals 416 and 420 is 180° or $\pi$. The thickness L is represented by the following formula: $\Delta\lambda=\lambda_1-\lambda_2=\lambda^2/(2(n-1)L)$.

Returning to FIG. 4, the end result is a $\pi$ phase difference between subsignals 416 and 420 as they enter fibers 424 and 426. Fiber 424 is aligned so that when the subsignals 416 and 420 enter, the odd channels appear ($\lambda_1, \lambda_3, \lambda_5...$) In the same manner, fiber 426 is aligned so that when the signals 416 and 420 enter, the even channels ($\lambda_2, \lambda_4, \lambda_6...$) appear. In aligning fibers 424 and 426, the fibers are placed at distances from the separator 400 so that the subsignals 416 and 420 enters the fibers at a particular phase angle.

Figure 6A:
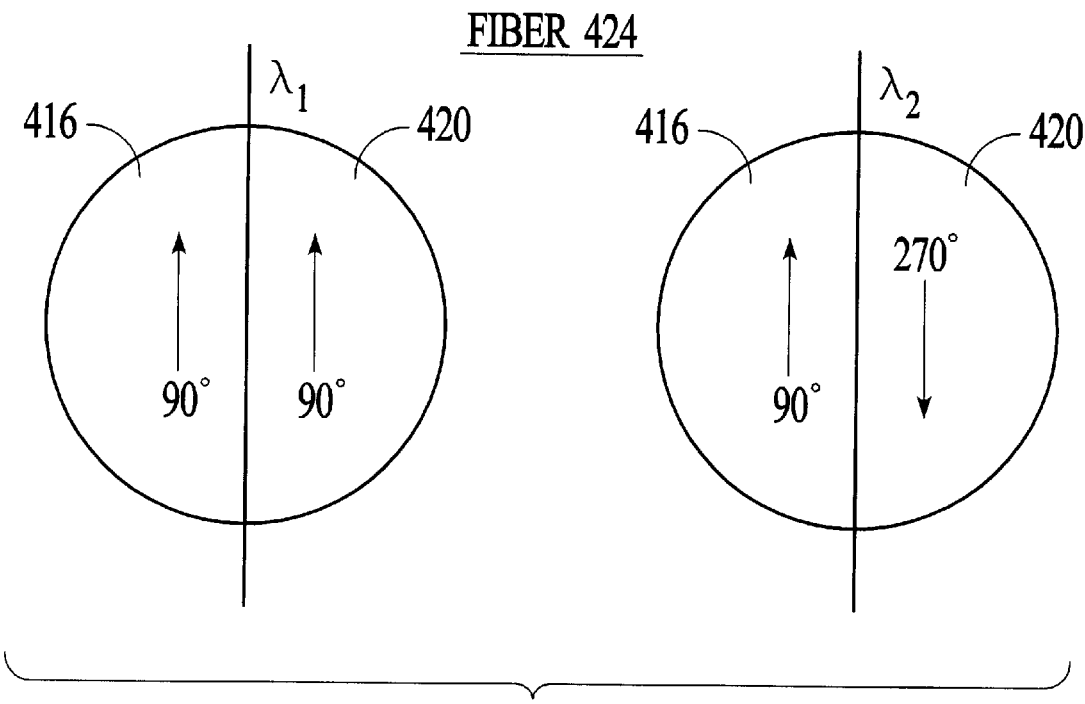
FIGS. 6A–6B are phase diagrams illustrating the output of channels from the first preferred embodiment of the present invention.
Figure 6B:
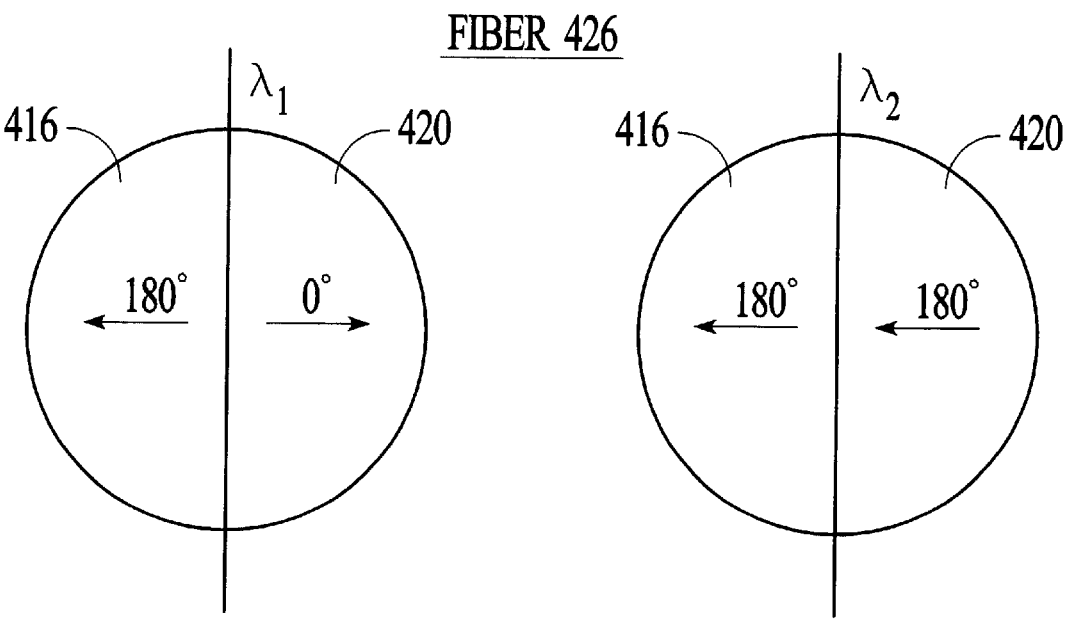

FIGS. 6A and 6B are phase diagrams which illustrate how the alignment of fibers and 426 and the phase difference of $\pi$ introduced between subsignals 416 and 420 facilitates the separation of the optical signal 412 into odd and even channels. FIGS. 6A and 6B are phase diagrams for example channels $\lambda_1$ and $\lambda_2$ as they enter fibers 424 and 426 where the fibers are aligned for channel separation. The phase diagrams in FIG. 6A show that fiber 424 is aligned so that channel $\lambda_1$ in subsignals 416 and 420 enters the fiber 424 with a 90° phase. However, for channel $\lambda_2$, they enter with a phase difference of 180°($\pi$), canceling each other out. Thus, in fiber 424, $\lambda_1$ appears while $\lambda_2$ does not. The diagrams in FIG. 6B show that fiber 426 is aligned so that channel $\lambda_1$ in subsignals 416 and 420 enter the fiber 426 with a phase difference of 180°($\pi$), canceling each other out, while $\lambda_2$ both enter with a phase of 180°. Thus, in fiber 426, $\lambda_1$ does not appear while $\lambda_2$ does. Because subsignals 416 and 420 are inherently periodic, once a fiber is aligned to capture one channel of the signal at a particular phase, it is also aligned for all of the channels of the subsignal. Thus, unlike the conventional filters and fiber gratings, which require the alignment of each individual separator, the separator 700 of the present invention is easier to align.

In the first preferred embodiment, the glass block 418 is preferably temperature stable, i.e., its refractive index does not change with temperature. Any glass which satisfies the following formula can be used: $\delta n/\delta T+(n-1)\alpha=0$, where n is the refractive index of the glass block, T is the temperature, and $\alpha$ is the thermal expansion coefficient of the glass block. One example of a glass which satisfies the above condition is an a thermal glass manufactured by "HOYA".

Although the glass block is preferably temperature stable, one of ordinary skill in the art will understand that a temperature sensitive glass coupled to a temperature controller stabilizer may be used with the first preferred embodiment without departing from the spirit and scope of the present invention.

Figure 7:
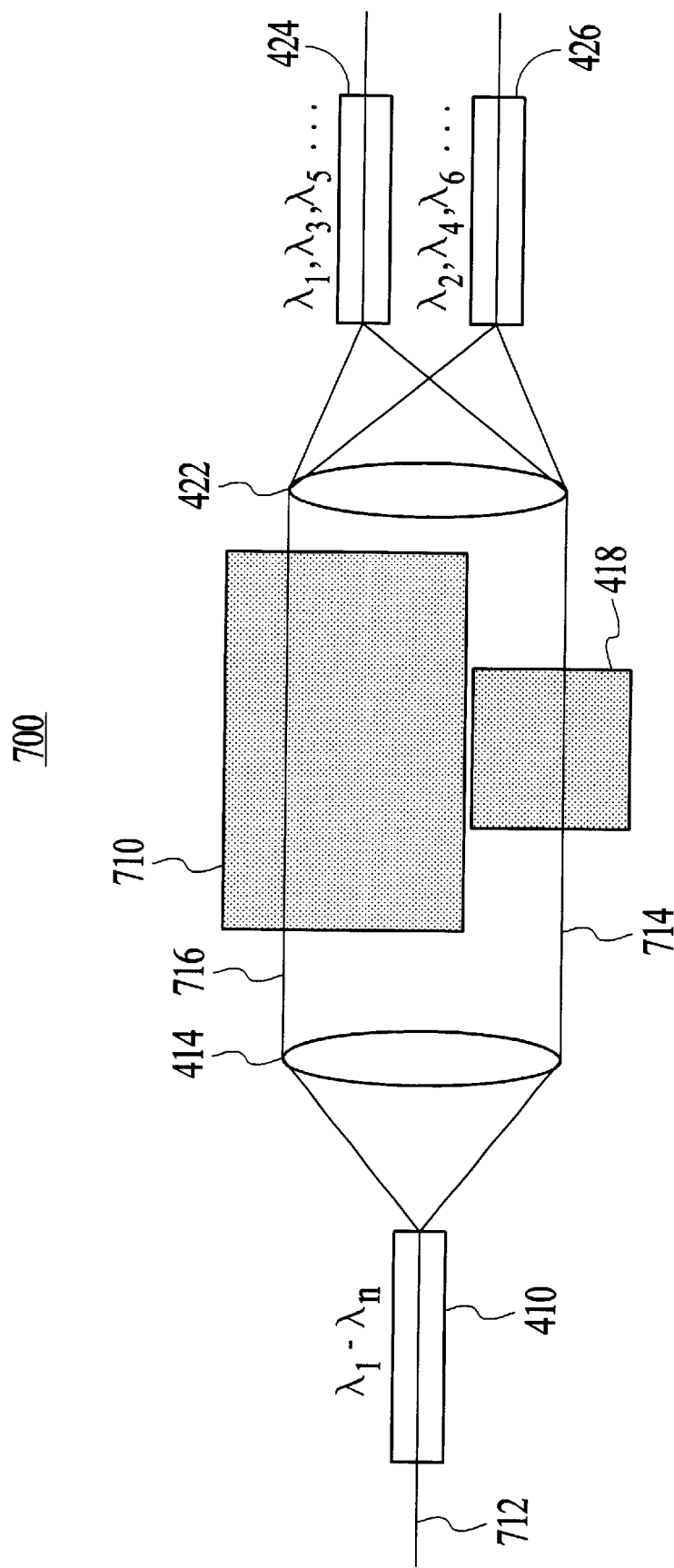
FIG. 7 is an illustration of a second preferred embodiment of a side view of a separator in accordance with the present invention.

FIG. 7 illustrates a side view of a second preferred embodiment of a separator 700 in accordance with the present invention. This separator 700 is identical to the separator 400 of the first preferred embodiment except for the use of an additional second glass block 710 which has a preferable thickness of 2L.

Figure 8:
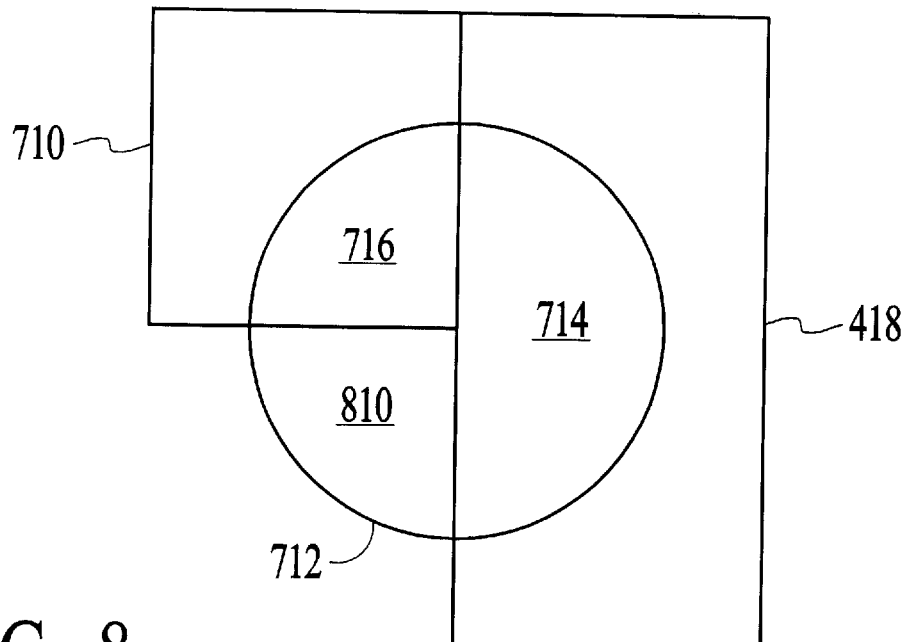
FIG. 8 is an illustration of a cross-section view of the second preferred embodiment of a separator in accordance with the present invention.
Figure 9:
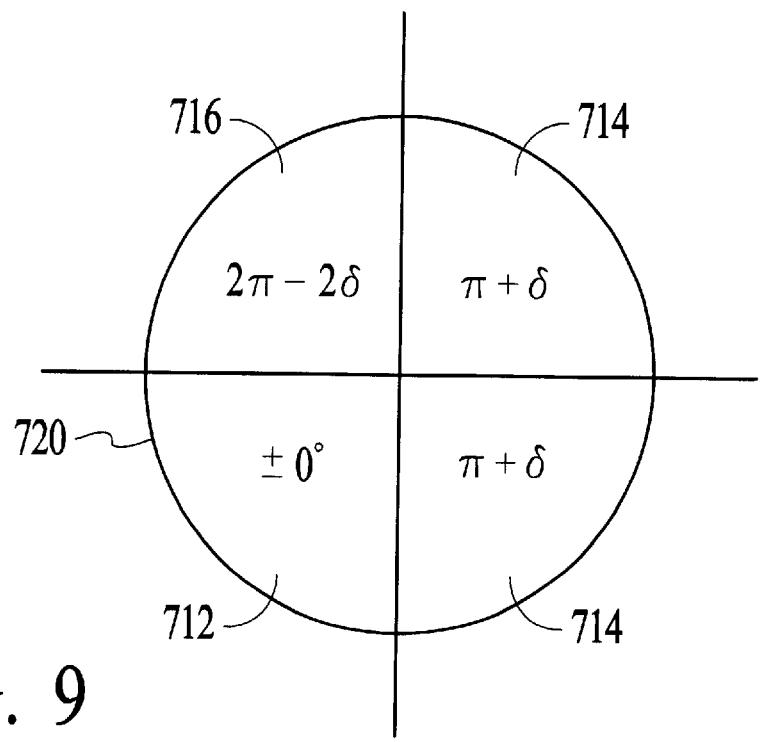
FIG. 9 is a phase diagram illustrating the output of channels from the second preferred embodiment of the present invention.

FIG. 8 illustrates a cross-sectional view of the signal 712 as it passes through the glass blocks 418 and 710. As with the first preferred embodiment, a subsignal 714, preferably 50% of the whole signal, passes through the first glass block 418. However, another subsignal 716, preferably 25% of the whole signal, passes through the second glass block 710. A third subsignal 810 comprises the remaining portion of the signal 712 which does not pass through either glass block 418 or 710. The glass block 418 introduces a phase difference of c between the subsignals 714 and 716, as explained above with FIG. 4. The glass block 710 introduces a phase difference of $2\pi$ between the subsignals 714 and 810, thus they remain in phase. However, the travel through the glass blocks 418 and 710 causes a slight deviation $\delta$ in the wave shape of the subsignals 714 and 716. The resulting phase differences for the signal 712 is illustrated in FIG. 9, with the subsignal 714, which travels through the glass block 418, having a phase difference of $\pi+\delta$ and subsignal 716 which travels through the glass block 710 having a phase difference of $2\pi-2\delta$. Subsignal 810 experiences no phase change as it only travels through air. The slight deviation $\delta$ causes the wave shape to have a wider isolation band. The deviation allows the controlled changing of the shape of the signals nonlinearly such that the tips of the signal's curves are flattened and a small amount of crosstalk is allowed.

Figure 1:
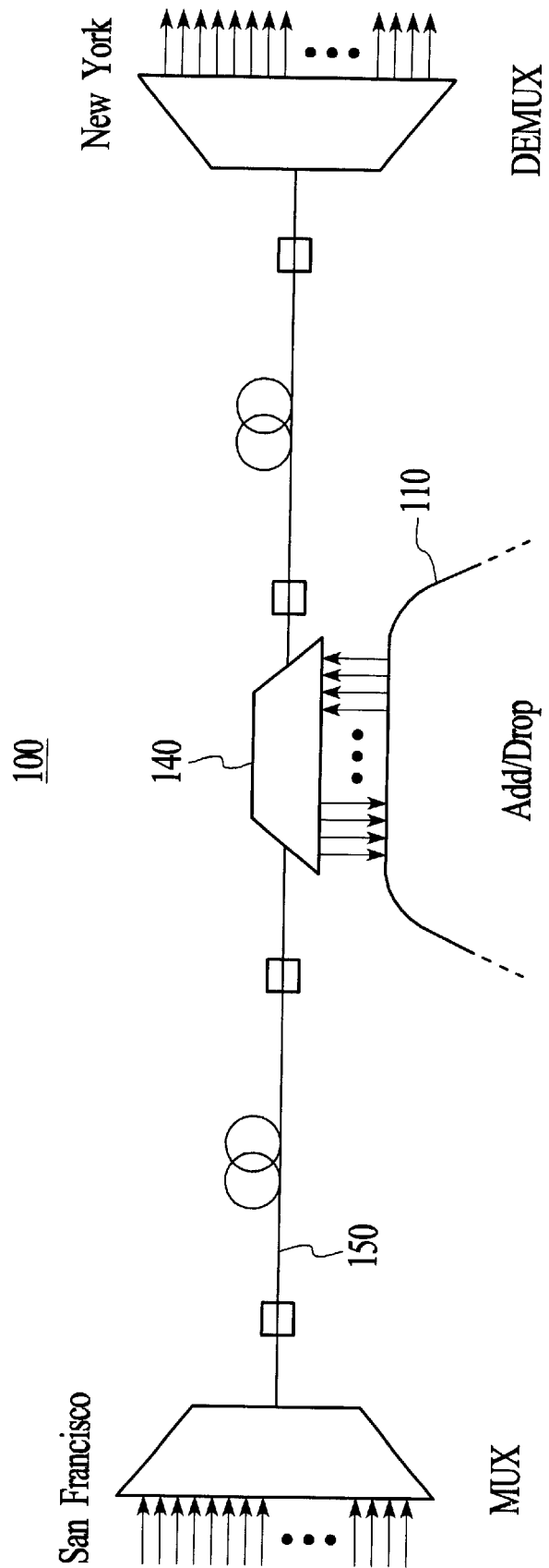
FIG. 1 is an illustration of a simplified optical network.
Figure 2:
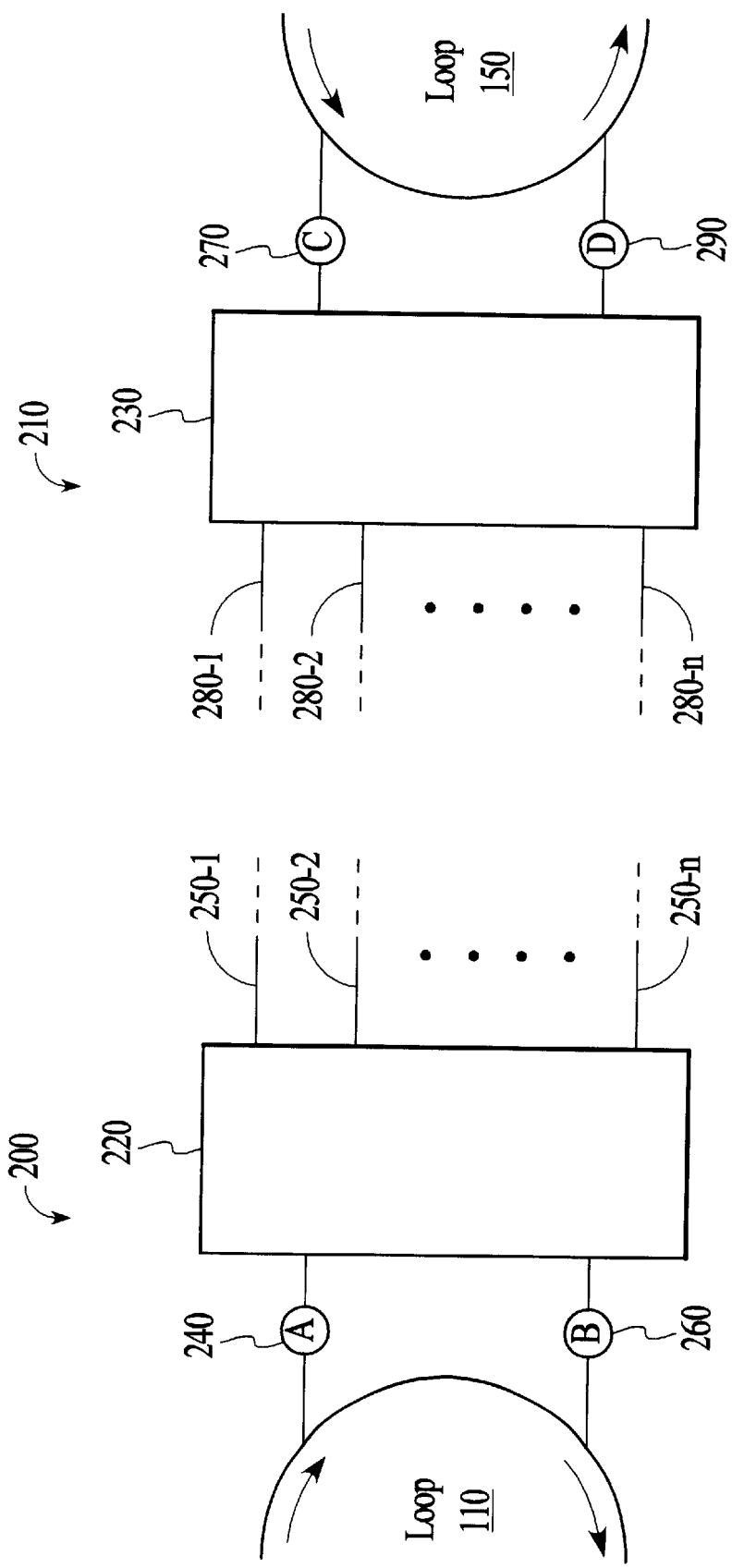
FIG. 2 is an illustration of conventional add/drop systems and dense wavelength division multiplexers.
Figure 3:
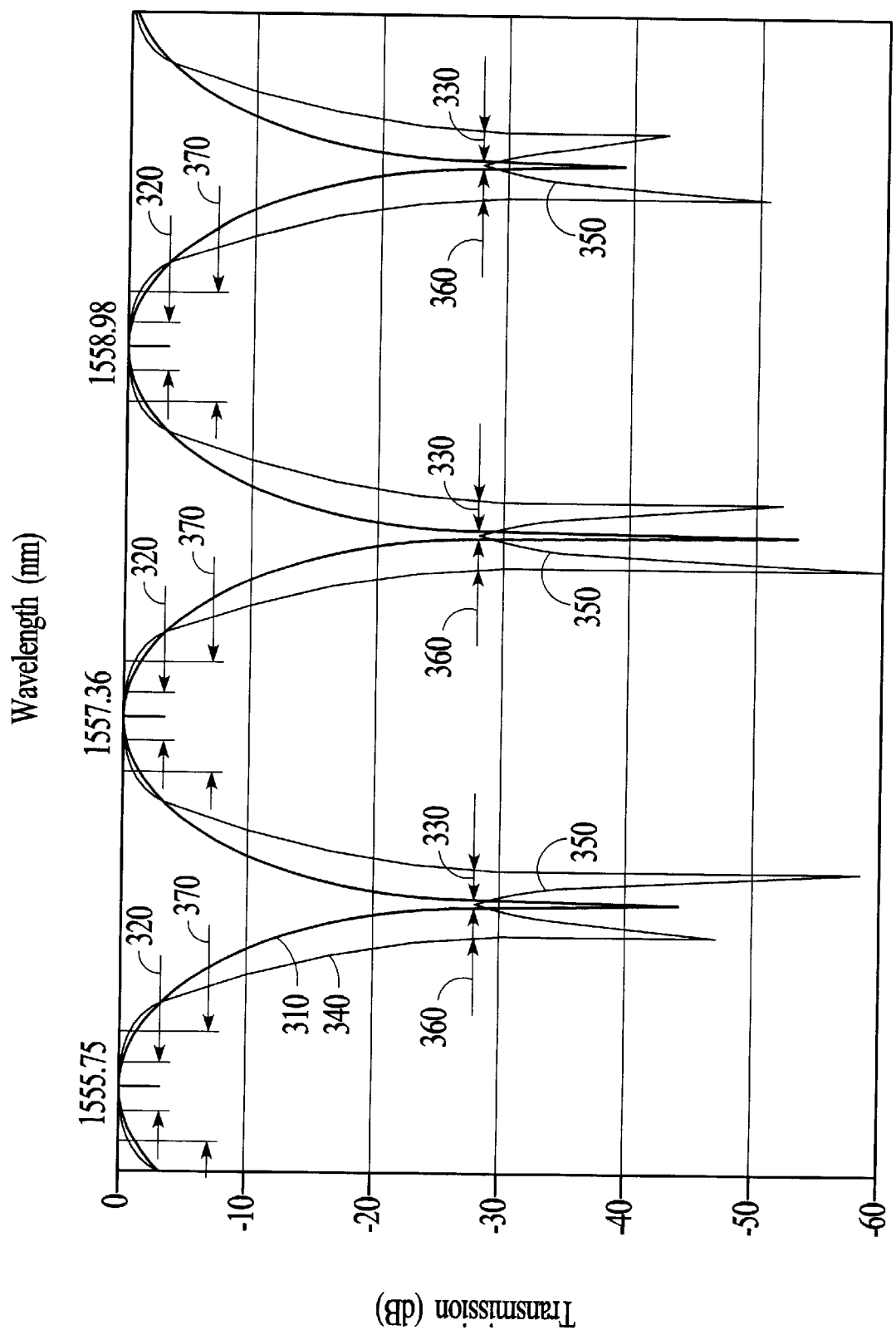
FIG. 3 is a graph of two sample spectrum curves, each comprised of channels, as they enter, respectively, a conventional dense wavelength division multiplexer and a dense wavelength division multiplexer in accordance with the present invention.

To illustrate the advantage of flattening the curve tips and allowing a small amount of crosstalk, please refer back to FIG. 3. FIG. 3 is a graph of spectrum curve 310 of a signal which has no deviation. This curve 310 has no crosstalk but has 6 very narrow isolation bands 330 and narrow pass bands 320. FIG. 3 is also a graph of spectrum curve 340 of a signal which would result with the deviation. There is a small amount of band shape distortion 350, but because of the existence of the band shape distortion 350, the isolation band 360 is significantly wider. In addition, the tips of the curve are flatter, resulting in a wider pass band 370. The amount of flattening and shape distortion allowed can be manipulated by selecting the amount of the signal which passes through the glass blocks 418 and 710. Thus, the separator 700 of the present invention, can be used to broaden the pass and isolation bands, which makes the curve more stable and tolerant to drift.

Figure 10:
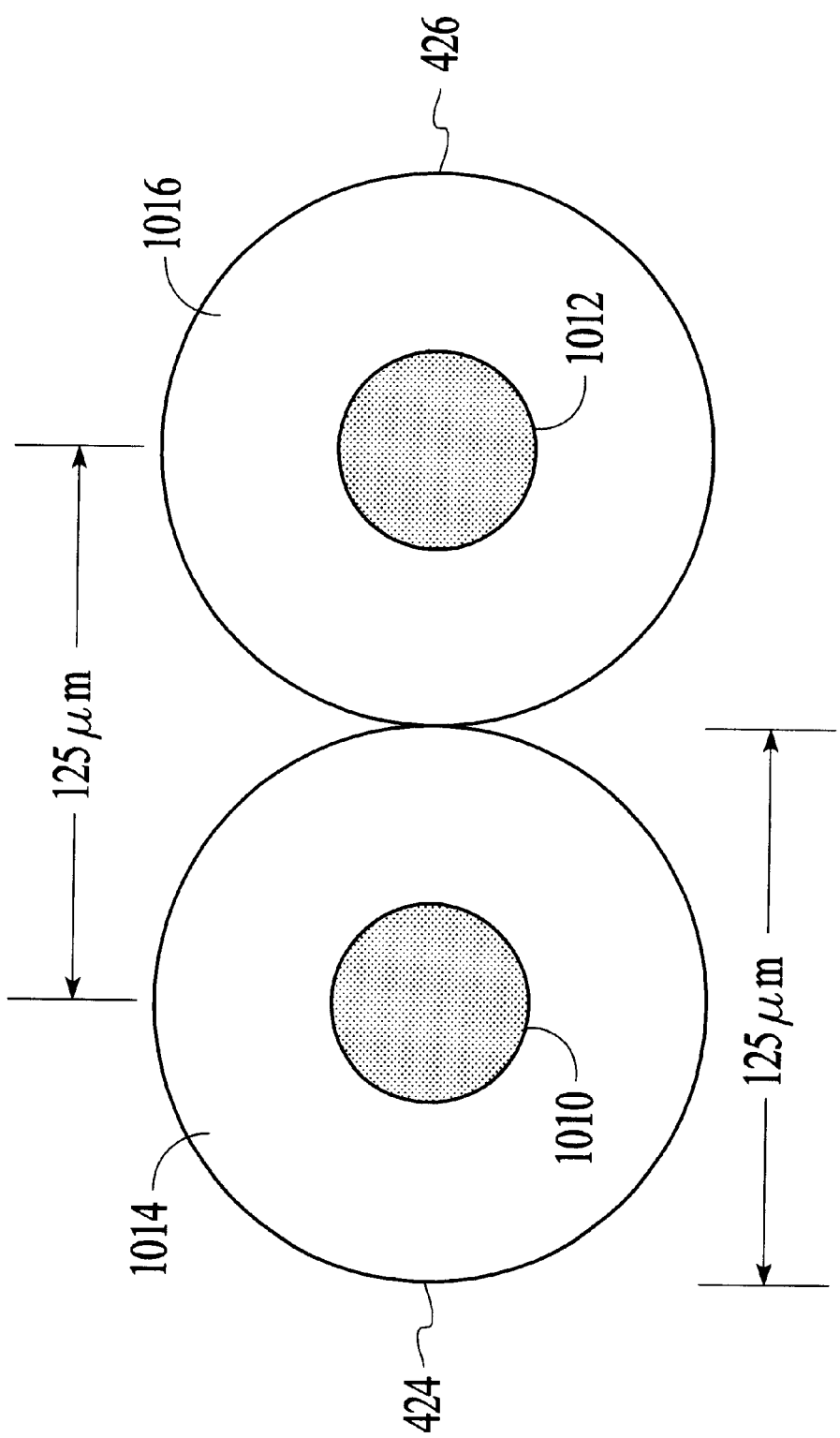
FIG. 10 is an illustration of two output optic fibers for the preferred embodiment of the present invention.

For the first and second preferred embodiments, typically the output fibers 424 and 426 must be very close together in order to properly align them to the signals 412 and 712 respectively. Often, the closeness required is smaller than is physically possible for unmodified fibers, as illustrated in FIG. 10. FIG. 10 illustrates the structure of fibers 424 and 426. Each fiber is composed of a core 1010 and 1012 through which optical signals travel, and a cladding layer around the core, 1014 and 1016. Typically, the cladding diameter of a single-mode optical fiber is approximately 125 $\mu$m. Thus, the closest distance which can be accomplished between the cores of the fibers 424 and 426 is 125 $\mu$m. However, in order to align the fibers correctly, the cores often must be closer, for example 10 $\mu$m apart. In these situations, the manufacturing technique illustrated in FIGS. 11A and 11B may be utilized.

Figure 11A:
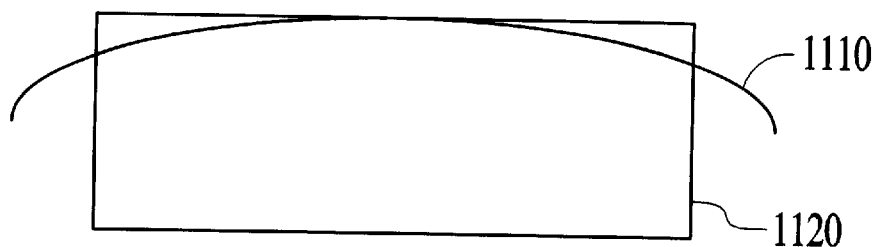
FIGS. 11A–11B are illustrations of a manufacturing technique for the output optical fibers in accordance with the present invention.
Figure 11B:
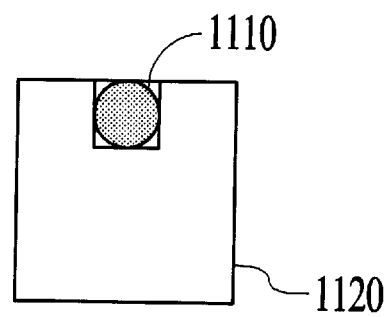
Figure 12:
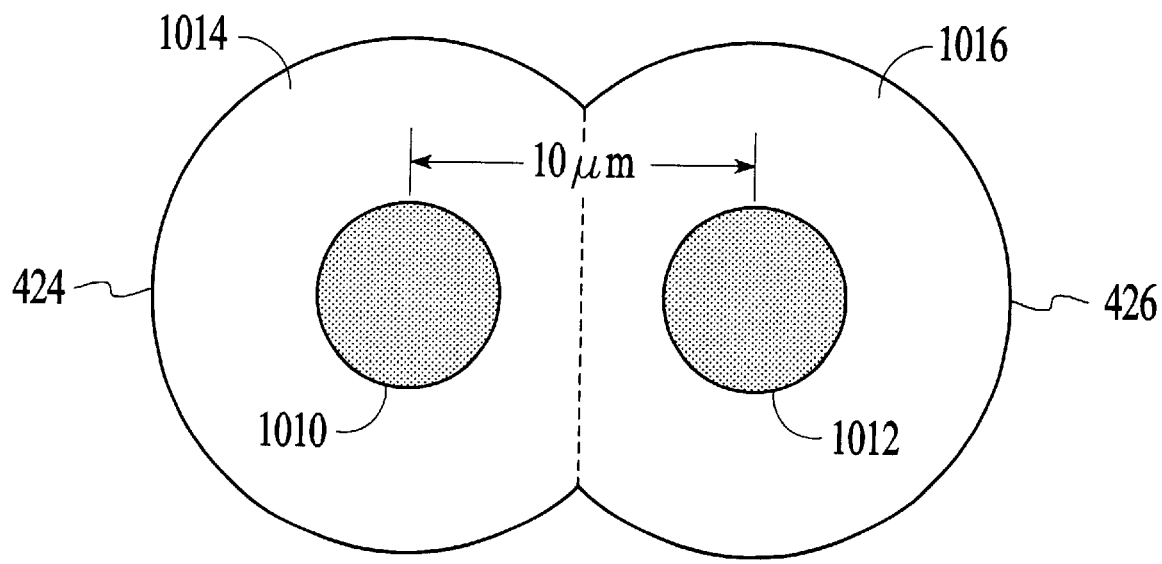
FIG. 12 is an illustration of the results of the manufacturing technique for the output optical fibers in accordance with the present invention.

FIGS. 11A and 11B illustrate a manufacturing technique for the fibers 424 and 426 of a separator 400 or 700 of the present invention. An optical fiber 1110 is first embedded into a block of solid material 1120, such as glass, with the curved configuration shown in FIG. 11A. FIG. 11B illustrates a cross-sectional view of the block 1120 with the fiber 1110 embedded within. The block 1120 is then mechanically ground until a portion of the cladding layer of fiber 1110 is ground away without damaging the core. The fiber 1110 is then cut where the cladding layer has been ground so that it becomes the ends of the fibers 424 and 426. FIG. 12 illustrates fibers 424 and 426 as placed directly next to each other where the fibers 424 and 426 were manufactured with the technique illustrated in FIGS. 11A and 11B. Now, when the ends of fibers 424 and 426 are placed directly next to each other, the 10 μm distance between the cores can be accomplished.

Figure 13:
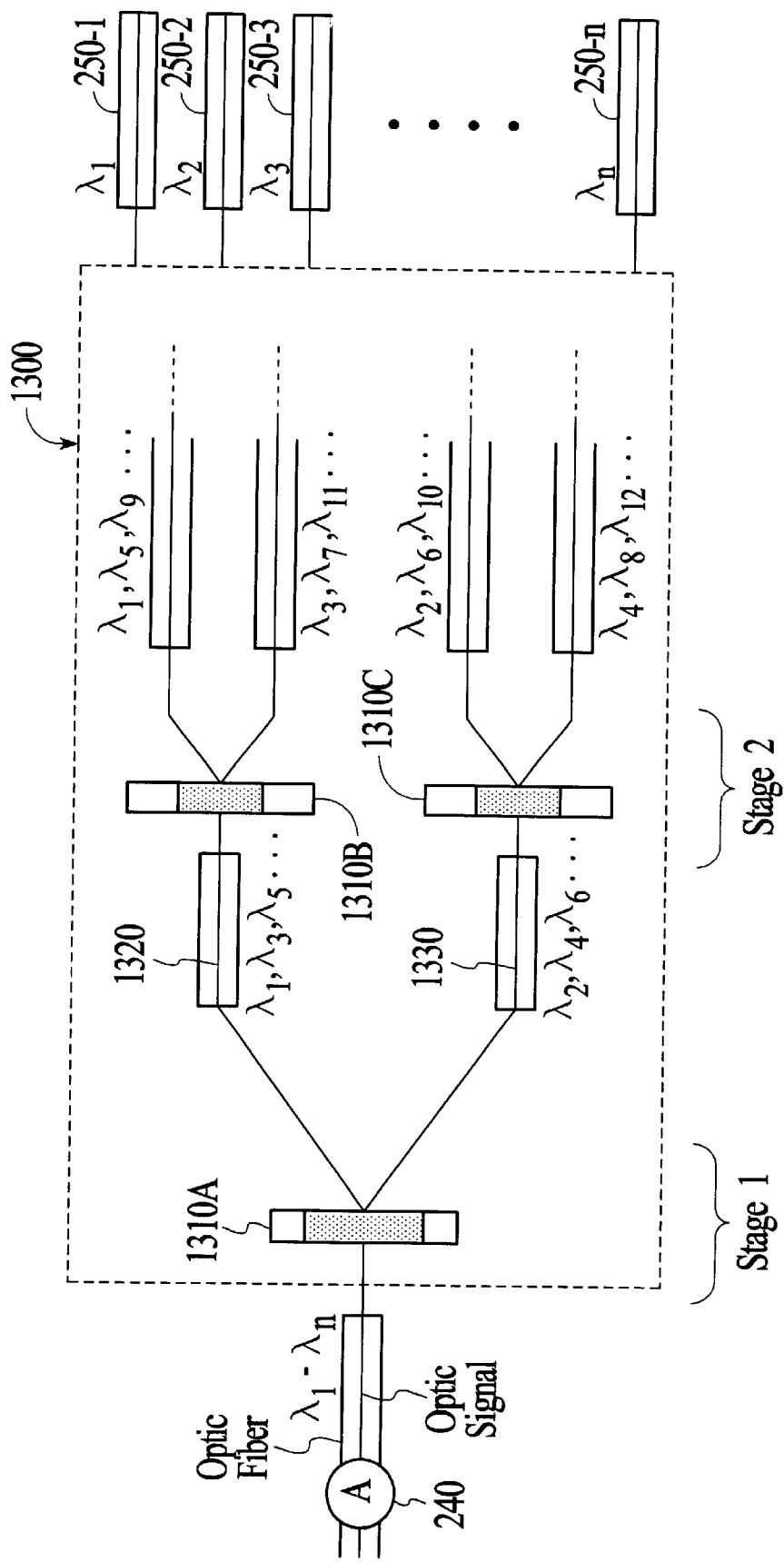
FIG. 13 is an illustration of a parallel cascade configuration of the first and second preferred embodiment of separators in accordance with the present invention.

An advantage of the separators 400 and 700 of the present invention is the ability to place them in a multi-stage parallel cascade configuration to reduce insertion loss. This configuration is illustrated in FIG. 13 and has been disclosed in co-pending U.S. patent application entitled "Fiber Optic Dense Wavelength Division Multiplexer Utilizing A Multi-Stage Parallel Cascade Method Of Wavelength Separation," Ser. No. 09/130,386, filed on Aug. 6, 1998. Applicant hereby incorporates the application by reference. In FIG. 13, an optical signal containing channels $\lambda_1$–$\lambda_n$ enters the DWDM of the present invention 1300 through node A (240). The signal passes through a separator 1310A of the present invention. The separator 1310A divides the signal into two separate signals, one containing the odd channels ($\lambda_1$, $\lambda_3$, $\lambda_5$, . . . ) (1320) and the other containing the even channels ($X_2$, $\lambda_4$, $\lambda_6$, . . . ) (1330). These odd-channel and even-channel signals are each passed through one of another pair of separators 1310B or 1310C, respectively, which further divides them by every other channel. This division continues until only one channel is outputted to each optical fiber, 250-1 through 250-n.

Figure 14:
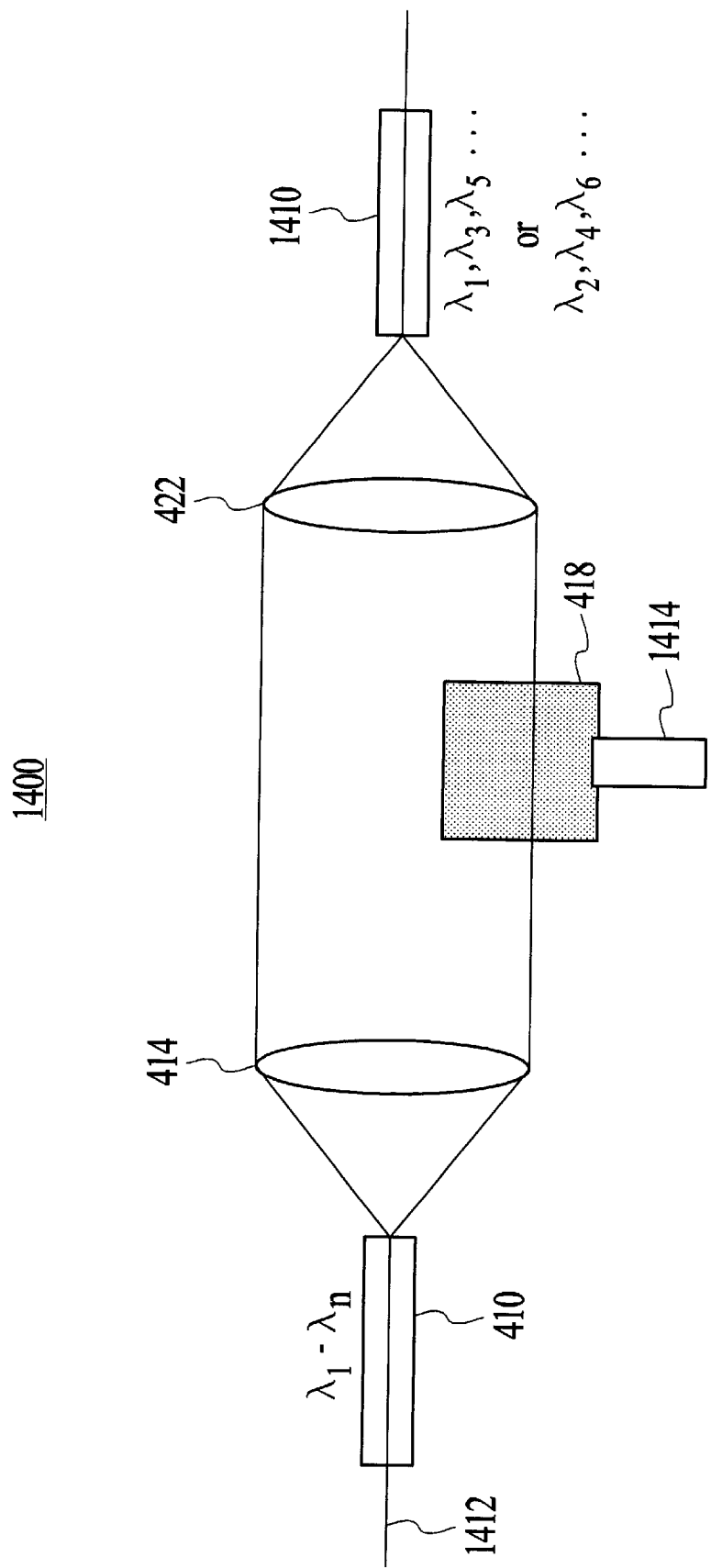
FIG. 14 is an illustration of a third preferred embodiment of a side view of a separator in accordance with the present invention.

FIG. 14 illustrates a side view of a third embodiment of a separator 1400 in accordance with the present invention. In this embodiment, the separator 1400 is identical to the separator 400 of the first preferred embodiment except only one output fiber 1410 is used. The glass block 418 may be coupled to a height adjustment mechanism 1414 which can raise or lower the glass block 418 into and out of the signal 1412.

Figure 15:
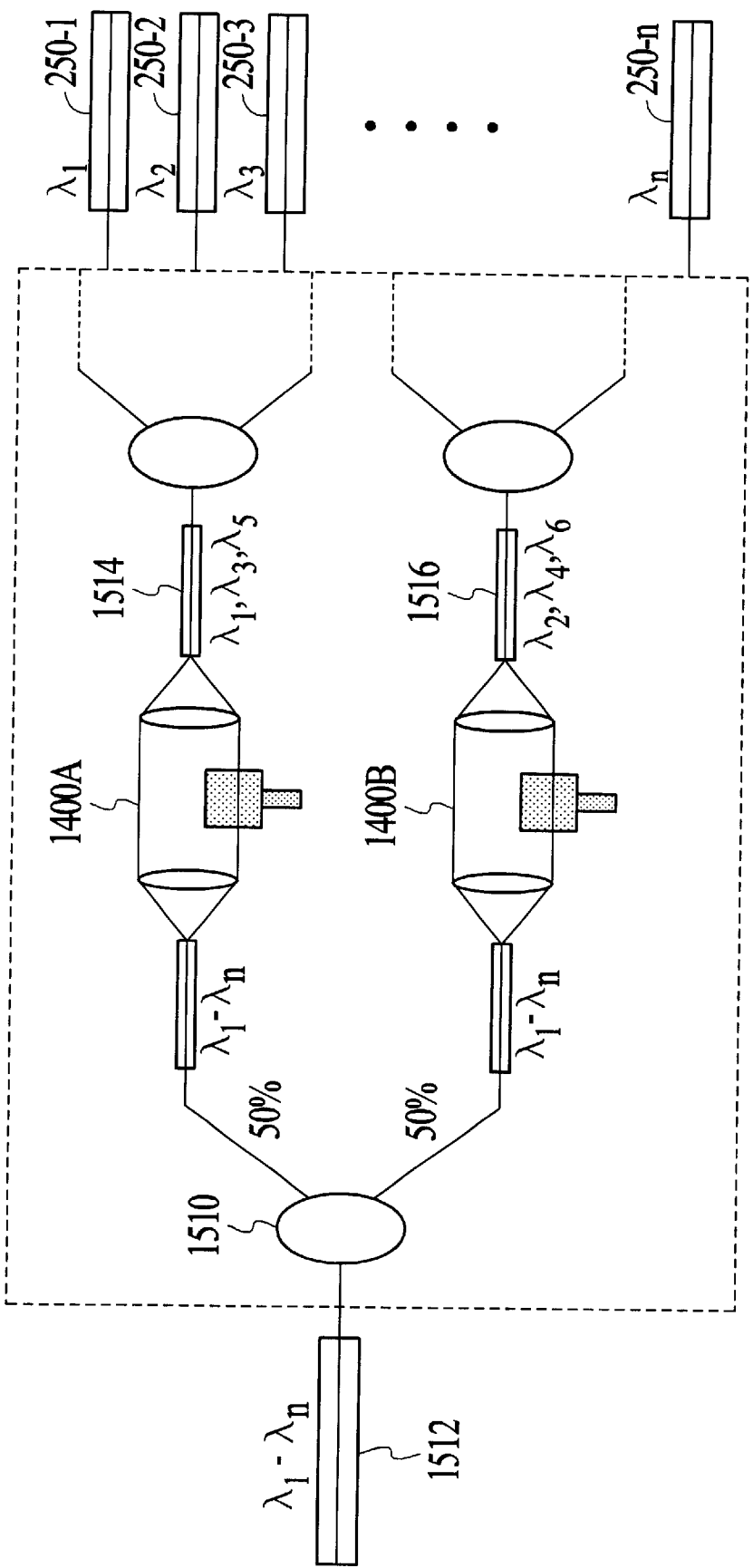
FIG. 15 is an illustration of a parallel cascade configuration of the third preferred embodiment of separators in accordance with the present invention.

As illustrated in FIG. 15, this separator 1400 can be used in a multi-stage parallel cascade configuration of separators in a DWDM if used in combination with a fiber coupler 1510. The fiber coupler splits the optical signal 1512 in half, with 50% of the signal going to one separator 1400A and the other 50% going to another separator 1400B. Fiber couplers 1510 are well known in the art and will not be further described here. One of the separators 1400A can then be configured to output the odd channels to fiber 1514 in the same manner as explained with the first preferred embodiment. The other separator 1400B can be configured to output the even channels to fiber 1516. These odd and even channels are each passed through another fiber coupler/separators combination which further divides them by every other channel. This division continues until only one channel is outputted to each optic fiber 250-1 through 250-n.

Returning to FIG. 14, the separator 1400 of the third preferred embodiment has an added utility as a half-band equalizer. By manipulating the height of the glass block 418 using the height adjustment mechanism 1414, the peaks and valleys of the wave shape are manipulated as well. The height of the glass block 418 may be adjusted so that the gains of the different channels are equalized.

Unlike the first and second preferred embodiments, the separator 1400 of the third embodiment does not require the fiber manufacturing method described in relation to FIGS. 11A and 11B since only one output fiber is used.

Although the separators of the present invention have been described as being utilized with the multistage parallel configuration, one of ordinary skill in the art will understand that the separators of the present invention may be utilized with other configurations without departing from the spirit and scope of the present invention.

Figure 16:
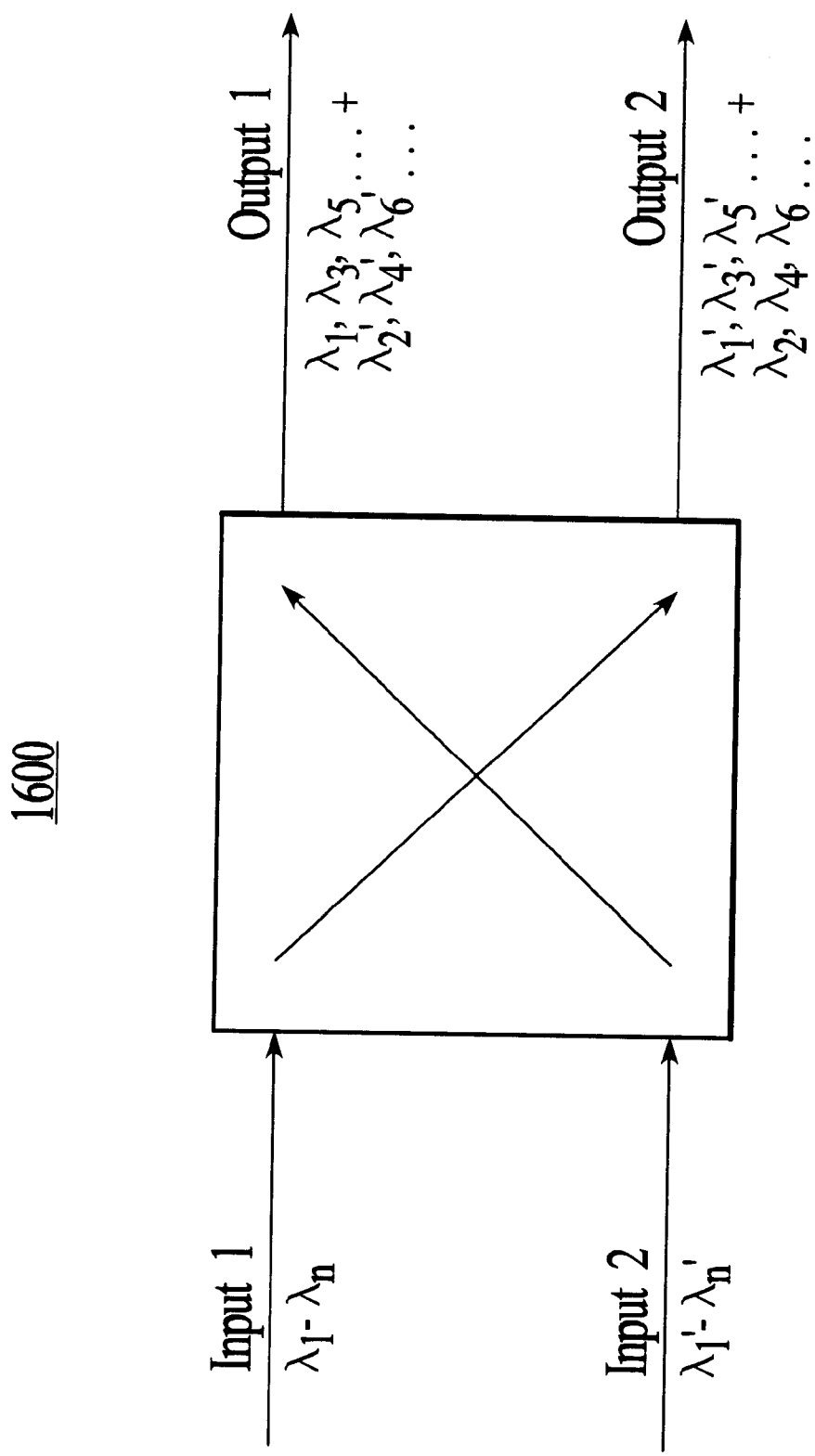
FIG. 16 is an illustration of a separator functioning as a 2×2 switch in accordance with the present invention.

Another added functionality of a separator 400, 700, and 1400 of the present invention is the ability to perform the add/drop function while also separating the channels. FIG. 16 is a simple block diagram of a separator 1600 functioning as a 2×2 wavelength sensitive switch. As illustrated, two signals containing $\lambda_1$–$\lambda_n$ and $\lambda_1'$–$\lambda_n'$ are input into the separator 1600. The separator 1600 then could drop the even channels of the first signal to the second signal while adding the even channels of the second signal to the first signal.

Figure 17:
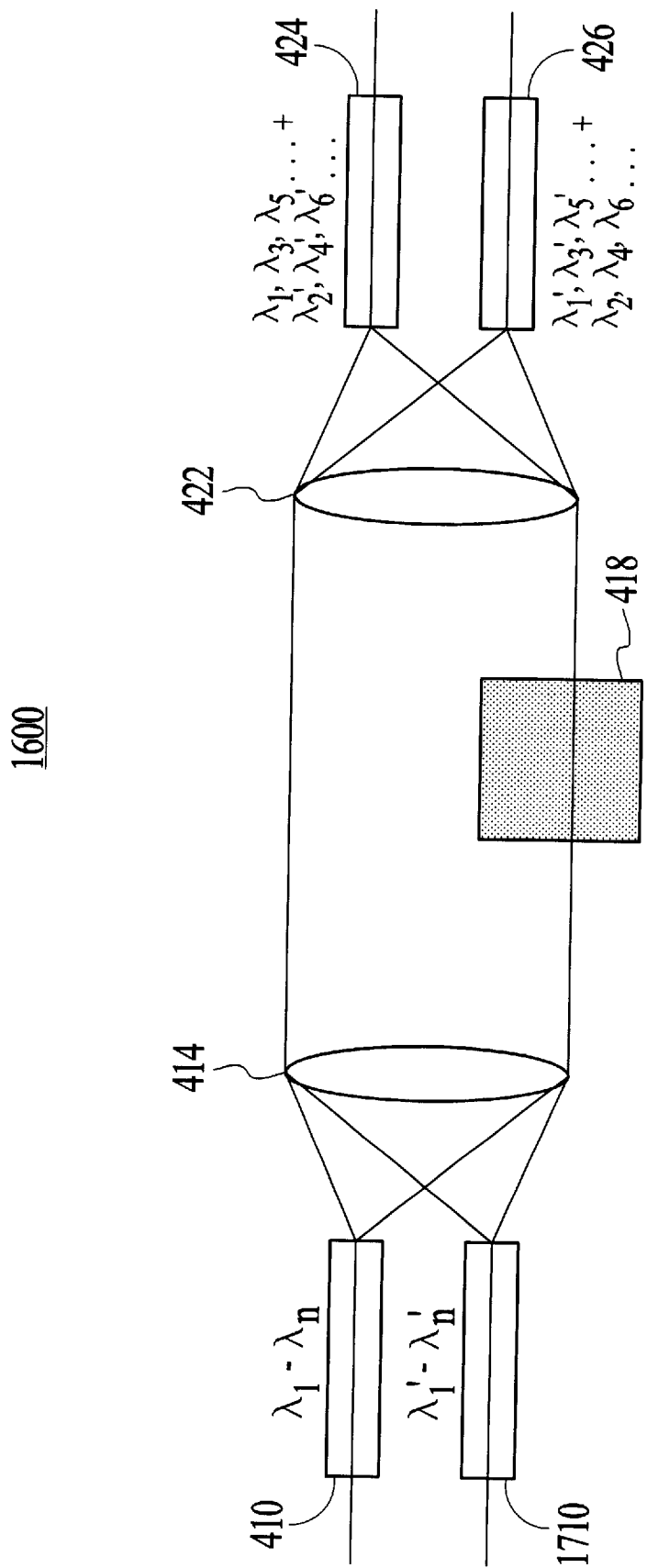
FIG. 17 is an illustration of the first preferred embodiment functioning as a 2×2 switch in accordance with the present invention.

To more particularly describe the utilization of a separator to perform the add/drop function, refer to FIG. 17 and the discussion below. FIG. 17 illustrates the first preferred embodiment of a separator in accordance with the present invention performing the add/drop function. The separator 1600 in FIG. 17 is identical to the separator 400 in FIG. 4 except for the input of a second signal containing $\lambda_1'$–$\lambda_n'$ via an additional optical fiber 1710. This second signal would be separated into its odd and even channels similarly to the first signal containing $\lambda_1$–$\lambda_n$. The result is that fiber 424 would contain the odd channels from the first signal ($\lambda_1$, $\lambda_3$, $\lambda_5$ . . . ) plus the even channels from the second signal ($\lambda_2'$, $\lambda_4'$, $\lambda_6'$ . . . ). Fiber 426 would contain the even channels from the first signal ($\lambda_2$, $\lambda_4$, $\lambda_6$ . . . ) plus the odd channels from the second signal ($\lambda_1'$, $\lambda_3'$, $\lambda_5'$ . . . ). By manipulating which separators in a dense wavelength division multiplexer performs the add/drop function, certain channels can be targeted.

A dense wavelength division multiplexer with a phase differential method of wavelength separation utilizing glass block interruption of the optic signal has been disclosed. The separators of the dense wavelength division multiplexer provide an ease in alignment and a higher tolerance to drifts due to the increase in the widths of the pass bands. They may also be placed in a multi-stage parallel cascade configuration to provide for a lower insertion loss by requiring an optical signal to travel through fewer optical components. The present invention may also be easily modified to perform the add/drop function as it separates channels. The materials required to manufacture and implement the dense wavelength division multiplexer in accordance with the present invention are readily available and do not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division de-multiplexer for separating an optical signal into optical channels comprising:

means for inputting an optical signal, the optical signal comprising a plurality of optical channels;

means for separating one or more of the plurality of optical channels by introducing a phase difference between at least two of the plurality of optical channels, wherein the separating means comprises at least one glass block; and means for outputting the separated plurality of optical channels along a plurality of optical paths.

2. The dense wavelength division de-multiplexer of claim 1, wherein the inputting means comprises:
   (a) at least one lens optically coupled to the separating means; and
   (b) at least one optic fiber optically coupled to the lens.

3. The dense wavelength division de-multiplexer of claim 1, wherein the outputting means comprises:
   (a) at least one lens optically coupled to the separating means; and
   (b) at least one optic fiber optically coupled to the lens.

4. The dense wavelength division de-multiplexer of claim 1, wherein the at least one glass block comprises a plurality of glass blocks, wherein each of a plurality of glass blocks interrupts a subsignal of the optical signal.

5. The dense wavelength division de-multiplexer of claim 4, wherein the plurality of glass blocks includes a first glass block,
   wherein the first glass block interrupts a first subsignal of the optical signal,
   wherein the first subsignal is 50% of the optical signal, and
   wherein the first subsignal is introduced a phase change of 180 degrees.

6. The dense wavelength division de-multiplexer of claim 5, wherein the plurality of glass blocks includes a second glass block,
   wherein the second glass block interrupts a second subsignal of the optical signal,
   wherein the second subsignal is 25% of the optical signal, and
   wherein the second subsignal is introduced a phase change of 360 degrees.

7. The dense wavelength division de-multiplexer of claim 5, wherein the separating means further comprises a height adjustment mechanism coupled to the first glass block, wherein the amount of the optical signal interrupted by the first glass block is varied by movement of the height adjustment mechanism.

8. A dense wavelength division de-multiplexer for separating an optical signal into optical channels comprising:
   at least one input optic fiber for inputting an optical signal;
   at least one input lens optically coupled to the at least one input optic fiber;
   at least one glass block optically coupled to the at least one input lens, wherein each of the at least one glass block interrupts a subsignal of the optical signal;
   at least one output lens optically coupled to the at least one glass block and the at least one input lens; and
   at least one output optic fiber optically coupled to the at least one output lens.

9. The dense wavelength division de-multiplexer of claim 8, wherein the at least one glass block comprises a first glass block,
   wherein the first glass block interrupts a first subsignal of the optical signal,
   wherein the first subsignal is 50% of the optical signal, and
   wherein the first subsignal is introduced a phase change of 180 degrees.

10. The dense wavelength division de-multiplexer of claim 9, wherein the at least one glass block further comprises a second glass block,
    wherein the second glass block interrupts a second subsignal of the optical signal,
    wherein the second subsignal is 25% of the optical signal, and
    wherein the second subsignal is introduced a phase change of 360 degrees.

11. The dense wavelength division de-multiplexer of claim 9, further comprising a height adjustment mechanism coupled to the first glass block, wherein the amount of the optical signal interrupted by the first glass block is varied by movement of the height adjustment mechanism.

12. A dense wavelength division de-multiplexer for separating an optical signal into optical channels comprising:
    at least one input optic fiber for inputting an optical signal;
    at least one input lens optically coupled to the at least one input optic fiber;
    a first glass block optically coupled to the at least one input lens, wherein the first glass block interrupts a first subsignal of the optical signal;
    a second glass block optically coupled to the at least one input lens, wherein the second glass block interrupts a second subsignal of the optical signal;
    at least one output lens optically coupled to the first glass block, the second glass block, and the at least one input lens; and
    at least one output optic fiber optically coupled to the at least one output lens.

13. The dense wavelength division de-multiplexer of claim 12, wherein the first subsignal is 50% of the optical signal, wherein the first subsignal is introduced a phase change of 180 degrees.

14. The dense wavelength division de-multiplexer of claim 12, wherein the second subsignal is 25% of the optical signal, wherein the second subsignal is introduced a phase change of 360 degrees.

15. A dense wavelength division de-multiplexer for separating an optical signal into optical channels comprising:
    at least one input optic fiber for inputting an optical signal;
    at least one input lens optically coupled to the at least one input optic fiber;
    a glass block optically coupled to the at least one input lens, wherein the glass block interrupts a portion of the optical signal;
    a height adjustment mechanism coupled to the glass block, wherein the amount of the optical signal interrupted by the glass block is varied by movement of the height adjustment mechanism;
    at least one output lens optically coupled to the glass block and the at least one input lens; and
    at least one output optic fiber optically coupled to the at least one output lens.

* * * * *